US006750408B2

United States Patent
Inoue et al.

(10) Patent No.: US 6,750,408 B2
(45) Date of Patent: Jun. 15, 2004

(54) MULTI-DIRECTIONAL OPERATION SWITCH AND MULTI-DIRECTIONAL INPUT DEVICE USING THE SAME

(75) Inventors: Hiroto Inoue, Kyoto (JP); Hiroyasu Okada, Hyogo (JP); Masaki Sawada, Osaka (JP); Tamotsu Yamamoto, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/453,038

(22) Filed: Jun. 3, 2003

(65) Prior Publication Data

US 2004/0026220 A1 Feb. 12, 2004

(30) Foreign Application Priority Data

Jun. 6, 2002 (JP) ........................................ 2002-165803

(51) Int. Cl.[7] .............................................. H01H 25/04
(52) U.S. Cl. ........................ 200/6 A; 200/5 R; 338/47; 338/92; 345/161
(58) Field of Search ............................ 200/4, 5 R, 6 A, 200/17 R, 18; 338/47, 92, 128; 345/161; 463/36, 37

(56) References Cited

U.S. PATENT DOCUMENTS

| 5,828,363 | A | * | 10/1998 | Yaniger et al. | 345/156 |
|---|---|---|---|---|---|
| 6,067,005 | A | * | 5/2000 | DeVolpi | 338/47 |
| 6,087,925 | A | * | 7/2000 | DeVolpi | 338/92 |
| 6,313,826 | B1 | * | 11/2001 | Schrum et al. | 345/161 |
| 6,437,682 | B1 | * | 8/2002 | Vance | 338/185 |
| 6,653,579 | B2 | * | 11/2003 | Inoue et al. | 200/6 A |

* cited by examiner

Primary Examiner—Michael A. Friedhofer
(74) Attorney, Agent, or Firm—RatnerPrestia

(57) ABSTRACT

In a multi-directional operation switch, an operating disk, upon being pressed at its upper side, tilts to depress a elastic pressing member, thus making hard rings of the driving member to press a resistor sheet sequentially. This operation allows resistor layers beneath the resistor sheet to directly contact annular electrically conductive layers facing the resistor layers in a desired sequence, respectively. The multi-directional operation switch has a reduced height and can produce a number of switching signals according to desired angular directions of switching operations.

15 Claims, 16 Drawing Sheets

MULTI-DIRECTIONAL OPERATION SWITCH AND MULTI-DIRECTIONAL INPUT DEVICE USING THE SAME

FIELD OF THE INVENTION

The present invention relates to a multi-directional operation switch and a multi-directional input device using the switch which are used for an input of data in an electronic device, such as a mobile telephone, a mobile data terminal, or a remote controller.

BACKGROUND OF THE INVENTION

A conventional multi-directional operation switch will be explained referring to FIGS. 15 to 17.

FIG. 15 is a front cross sectional view of the conventional multi-directional operation switch. An upper opening of a box-like case 1 made of insulating resin is covered with a cover 2 of a metal sheet. In the case 1, four of front, rear, left, and right, peripheral fixed contacts 3 to 6 provided on a bottom side thereof by insert forming, as shown in an exploded perspective view of FIG. 16. Four elastic strip portions 9 to 12 of a common movable contact 8 secured to protrusions 1A and connected to a common lead 7 are located over peripheral fixed contacts 3 to 6 to face the contacts 3 to 6. A supporter 14 urged upward by a compression coil spring 13 mounted along an inner wall of the case 1 has square uppermost end 14A pressed to contact the cover 2. The supporter 14 has a recess 14B provided in the center thereof for accommodating a semi-spherical pivotable member 15. More particularly, the pivotable member 15 has a flange portion 15A located on a rim portion about the center recess 14B of the supporter 14 while having a round portion 15B fitting to a round opening 2A provided in the center of the cover 2. The center recess 14B restricts a pivotal movement of the flange portion 15A in a lateral direction of the pivotable member 15. The pivotable member 15 has a small spherical bottom 15C provided at the center of the lower side thereof which directly contacts a bottom center of the case 1 and can thus be tilted in any direction by its pivotal movement. A rod-like operating shank 16 extending upwardly from the top of the round portion 15B of the pivotable member 15 has a knob 17 mounted to the distal end 16A thereof. The supporter 14 has pressing portions 18A to 18D (portions 18B and 18C are not shown) provided on an edge of the lower side thereof corresponding to elastic strip portions 9 to 12 of the common movable contact 8, respectively.

An operation of the conventional multi-directional operation switch will be explained. FIG. 15 illustrates the switch is turned off while the operating shank 16 is held at a neutral center position.

When the knob 17 mounted to the distal end 16B of the operating shank 16 is depressed at the upper left in a direction A in the front cross sectional view of FIG. 17, the operating shank 16 tilts, and the pivotable member 15 turns to the left. At this moment, the round portion 15B contacts directly the inner edge in the round opening 2A of the cover 2. Simultaneously, the flange portion 15A of the pivotable member 15 presses down at the left against the bottom at the recess 14B of the supporter 14. This operation causes the supporter 14 to tilt leftward about the square uppermost end 14A at the right or opposite side to the left as a fulcrum. As the elastic strip portion 9 is pressed down against the fixed contact 3 by the pressing portion 18A of the supporter 14, the common movable contact 8 is electrically connected with the fixed contact 3, thus outputting a switching signal between terminal ports 7A and 3A.

At the moment, the uppermost end 14A at the left of the supporter 14 departs downwardly from the lower side of the cover 2 as resisting against a yielding force of the coil spring 13.

Then, when the depressing of the knob 17 is canceled, the yielding force of the coil spring 13 drives the supporter 14 and the pivotable member 15 to return back to their original neutral positions shown in FIG. 15. Simultaneously, the elastic strip portion 9 moves back by its elastic force from the fixed contact 3 to the original position shown in FIG. 15, hence turning the switch off.

Similarly, while the knob 17 mounted to the operating shank 16 shifts to the right, front, or rear, the switching signal can be output from one of lead ports 4A to 6A.

However, although an electronic device is demanded to have a reduced thickness or overall dimensions, such conventional multi-directional operation switch is large in the height and permit one switching signal to be released by any single action towards a desired direction.

SUMMARY OF THE INVENTION

A multi-directional operation switch includes plural annular conductive layers provided concentrically and having lead ports, respectively, an elastic first insulating sheet spaced by a distance from the annular conductive layers, an annular resistor layer provided on a first side of the first insulating sheet, facing the annular conductive layers, and having at least three lead ports, and an operating member including plural pressing portions provided over the annular conductive layers corresponding to the pressing portions, respectively. The pressing portions is provided over a second side of the first insulating sheet. The pressing portions of the operating member presses the first insulating sheet to make the annular conductive layers sequentially contact the resistor layer.

The multi-directional operation switch is low in the height and can produce a number of different switching signals depending on desired angular directions of its switching operation.

DESCRIPTION OF THE PREFERRED EMBODIMENTS (Embodiment 1)

Figure 1:
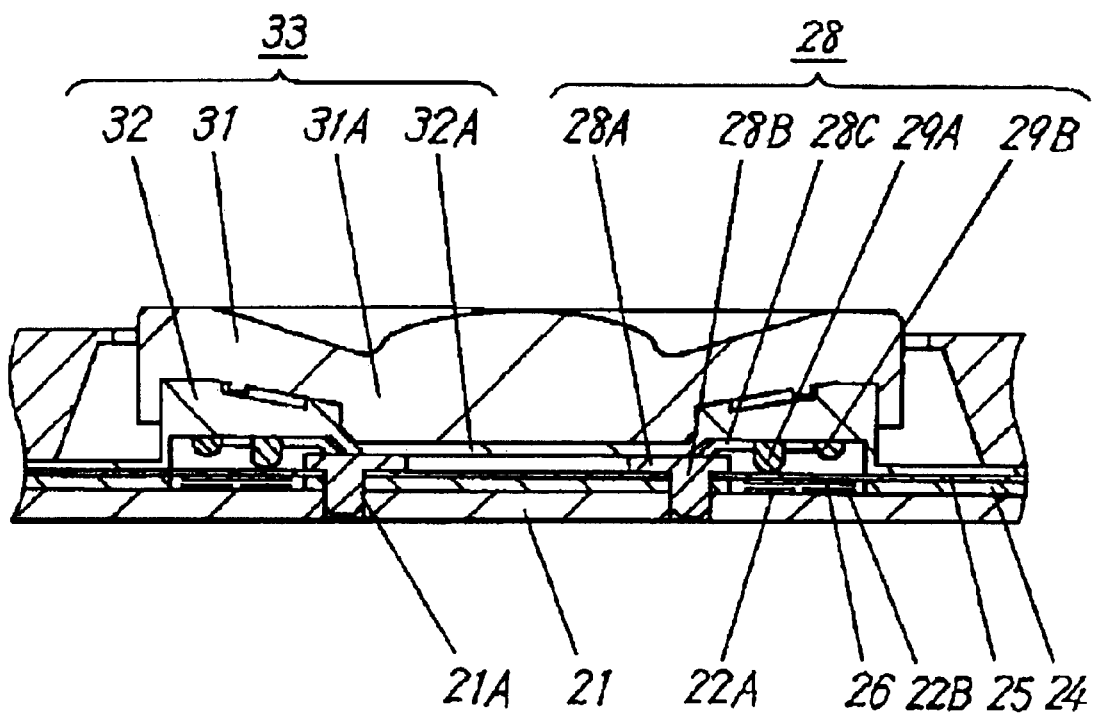
FIG. 1 is a front cross sectional view of a multi-directional input device of an electronic device equipped with a multi-directional operation switch according to exemplary embodiment 1 of the present invention.
Figure 2:
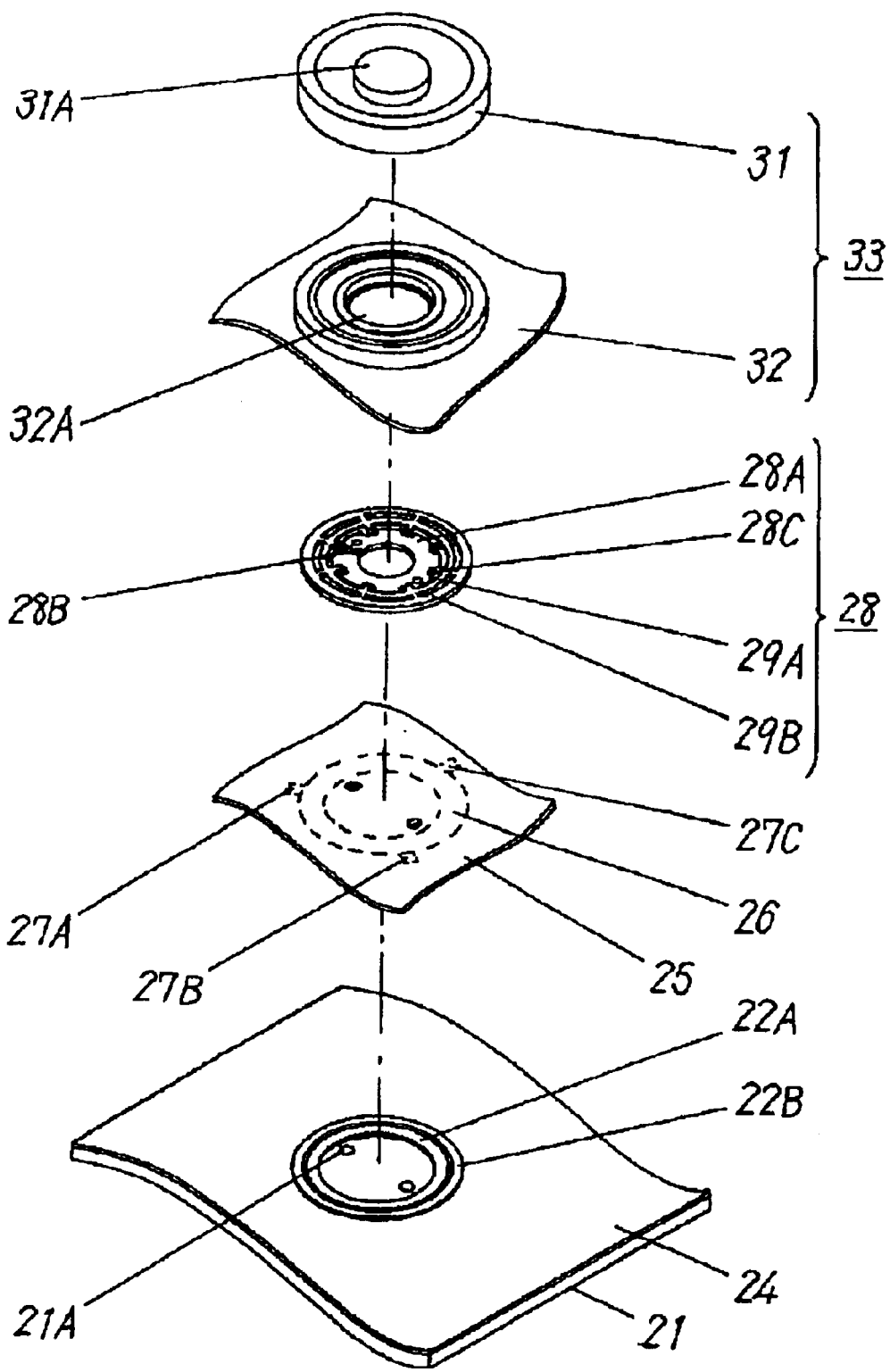
FIG. 2 is an exploded perspective view of the multi-directional operation switch of embodiment 1.

FIG. 1 is a front cross sectional view of an electronic input device equipped with a multi-directional operation switch according to exemplary embodiment 1 of the present invention. FIG. 2 is an exploded perspective view of the multi-directional operation switch, and FIG. 3 is a schematic view of a switching contact of the input device.

An insulating board 21 as a wiring board of the electronic device has two electrically separated conductive layers 22A and 22B of annular shapes mounted concentrically with each other on an upper side of the board. As shown in FIG. 3, the annular conductive layers 22A and 22B have lead ports 23A and 23B, respectively. Since the multi-directional operation switch has the two annular conductive layers 22A and 22B provided on the wiring board, the electronic device includes a small number of components and has a reduced overall dimensions including its height, thus being inexpensive.

A resistor sheet 25 made of flexible insulating sheet is provided via a spacer 24 over the insulating board 21. The resistor sheet 25 has an annular resistor layer 26 having a uniform specific resistance provided on one side of the sheet to face the annular conductive layers 22A and 22B and is spaced from the layers 22A and 22B by a predetermined distance. The resistor layer 26 has three lead ports 27A, 27B, and 27C located at equal angular intervals.

Figure 3:
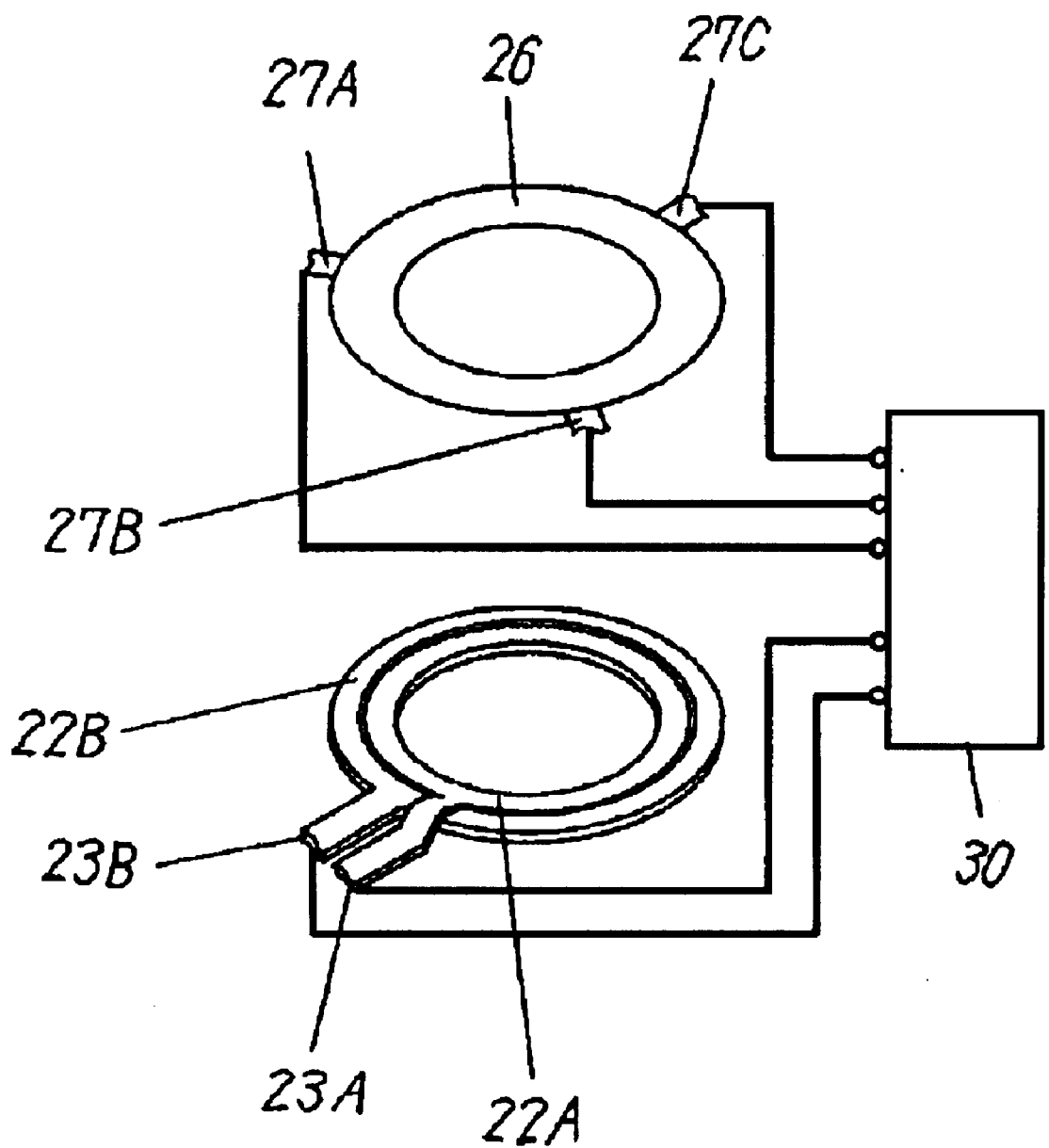
FIG. 3 is a schematic view of a switching contact of the multi-directional operation input device of embodiment 1.

As shown in FIG. 3, the lead ports 23A and 23B of the annular conductive layers 22A and 22B and the three lead ports 27A, 27B, and 27C of the resistor layer 26 are connected with wires to a microcomputer 30 installed in the electronic device.

Figure 4A:
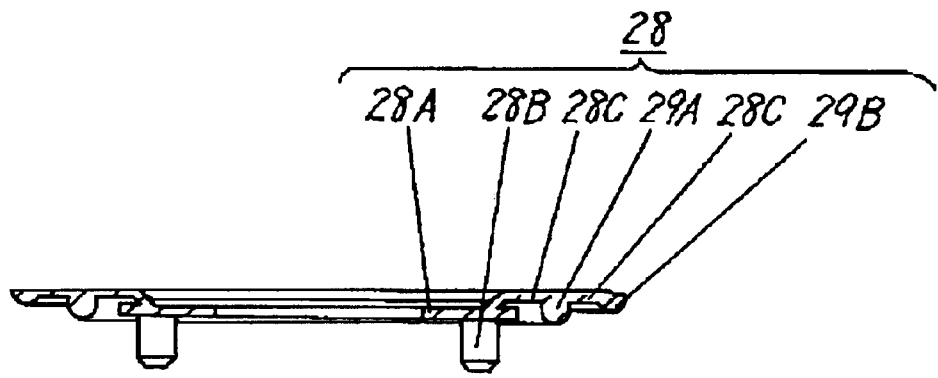
FIG. 4A is a side cross sectional view of a driving member of the multi-directional operation switch of embodiment 1.
Figure 4B:
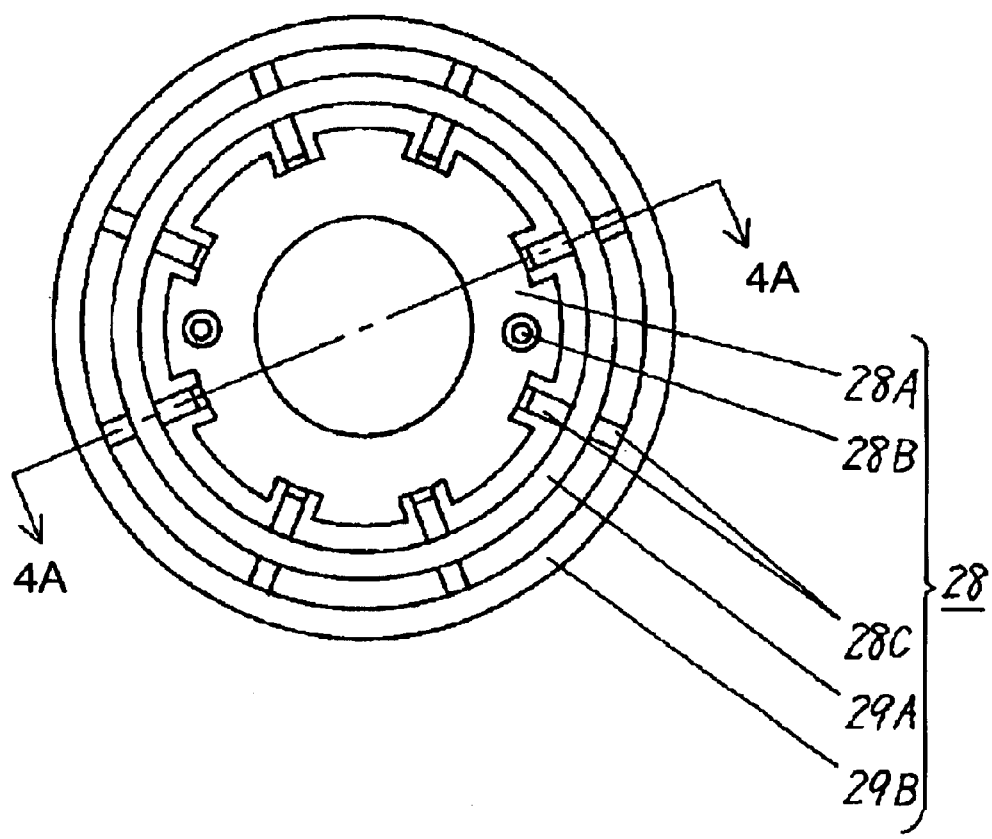
FIG. 4B is a lower side view of the driving member of the multi-directional operation switch of embodiment 1.

FIG. 4A is a side cross sectional view of a driving member 28 made of elastic hard resin, and FIG. 4B is an upper view of the driving member 28. FIG. 4A illustrates the cross section of the driving member 28 at a line 4A—4A of FIG. 4B. The driving member 28 is mounted at a side of the resistor sheet 25 opposite to the resistor layer 26. The driving member 28 is fixed so that two bosses 28B under center fitting region 28A extending through the spacer 24 and the resistor sheet 25 fit into two holes 21A provided in the insulating board 21. The driving member 28 has elastic arms 28C extending from the center fitting region 28A to support hard rings 29A and 29B. The rings 29A and 29B have diameters determined to match the annular conductive layers 22A and 22B, respectively, and can move elastically and separately in upward and downward displacement.

More specifically, the hard rings 29A and 29B are supported such a manner that the inner hard ring 29A is located closer to the resistor sheet 25 than the outer hard ring 29B, while the outer hard ring 29B stays further from the resistor sheet 25.

Since the hard rings 29A and 29B on the driving member 28 are located together with the annular conductive layers 22A and 22B over the insulating board 21, the positional relationship between the hard ring 29A and the annular conductive layer 22A and between the hard ring 29B and the annular conductive layer 22B can be maintained accurately.

An operating disk 33 includes an elastic pressing member 32 of elastic material, such as resin or rubber, fixedly mounted to a lower side of a hard operating head 31 having a size to cover the driving member 28. The disk 33 is arranged horizontally on the driving member 28. A center fitting region 28A of the driving member 28 supports a center disk region 31A of the hard operating head 31 and a center thin region 32A of the elastic pressing member 32. At this moment, a lower side of the elastic pressing member 32 contacts respective upper sides of the hard rings 29A and 29B.

The multi-directional operation switch of embodiment 1 includes an operation assembly including the hard operating head 31, the elastic pressing member 32, and the driving member 28. The elastic pressing member 32 covers throughout the upper side of the resistor sheet 25.

An operation of the electronic device equipped with the multi-directional operation switch will now be explained.

Figure 5:
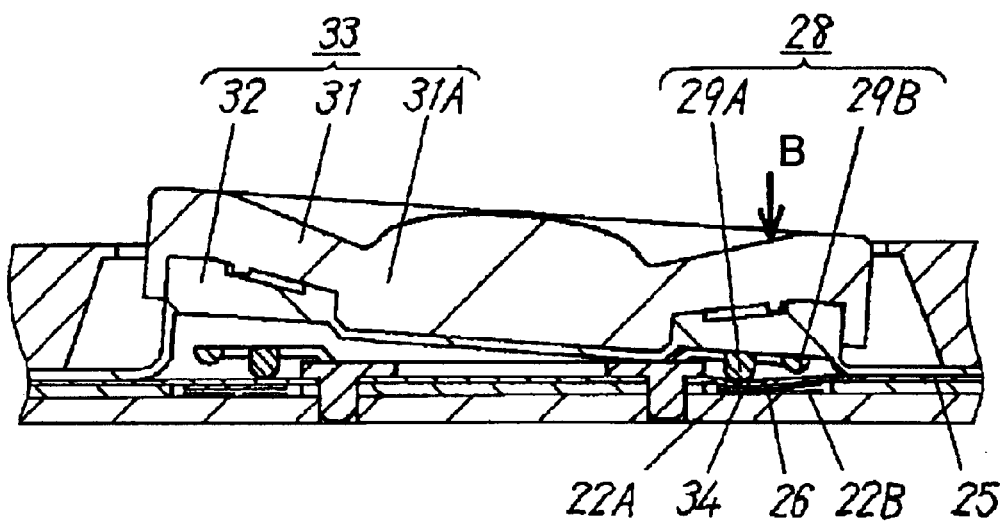
FIG. 5 is a front cross sectional view of the multi-directional input device of embodiment 1.

When the operating disk 33 of the multi-directional operation switch is depressed at a given location in a direction B in the front cross sectional view of FIG. 5, the operating disk 33 tilts down about the lower corner at a peripheral edge of the center disk region 31A of the hard operating head 31 as a fulcrum. This operation accordingly causes the elastic pressing member 32 beneath the center disk region 31A to partially press the lower side at a depressing position of the inner hard ring 29A of the driving member 28 against the upper side of the resistor sheet 25 which thus deflects downwardly. As the result, the resistor layer 26 on the lower side of the resistor sheet 25 directly contacts the annular conductive layer 22A at the inner side, hence allowing a point of contact 34 to establish a electrical connection between the lead ports 27A to 27C of the resistor layer 26 and the lead port 23A of the annular conductive layer 22A.

At this moment, the annular conductive layer 22B at the outer side dis not connected with the resistor layer 26.

Figure 6:
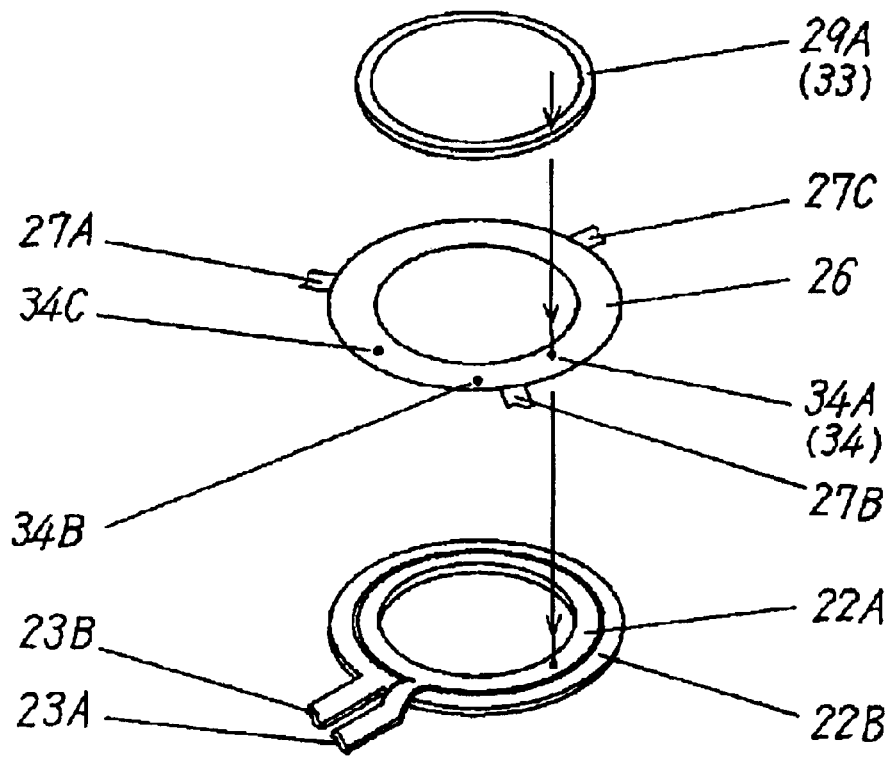
FIG. 6 is a schematic view of the multi-directional input device of embodiment 1 for explaining an operation of inputting of a switching location.

FIG. 6 is a schematic view for explaining an identification of an angle which the pressing operation of the operating disk 33 is conducted. As a first condition for the identification, the microcomputer 30 grounds the lead port 27B of the resistor layer 26 (0V) and applies a direct-current (DC) voltage (e.g. 5V) to the lead port 27A. A voltage (e.g. 0.5V) output from the lead port 23A of the annular conductive layer 22A with the lead port 27C which is opened is then measured by the microcomputer 30. The microcomputer 30 compares the output voltage with voltages which correspond to pressed points and are previously stored. More specifically, the microcomputer provides first data indicating that the point is a point 34A between the lead ports 27B and 27C or a point 34B between the lead ports 27A and 27B.

Next, as a second condition for the identification, the microcomputer 30 grounds the lead port 27C of the resistor layer 26 to (0V) and applies a DC voltage (e.g. 5V) to the lead port 27B. The microcomputer reads a voltage output from the lead port 23A of the annular conductive layer 22A while opening the lead port 27A. The microcomputer 30 compares the output voltage with voltages which correspond to pressed points and are previously stored. More specifically, the microcomputer provides second data indicating that the point is a point 34A between the lead ports 27B and 27C or a point 34C close to the lead port 27A.

Then, the microcomputer 30, comparing the first and second data, judges that the point 34A represents the angle of the pressing operation from the matching of the two data, and outputs a signal indicating the angle. The signal is transmitted via wirings (not shown) on the insulating board 21 to a circuit in the electronic device.

Thus, the microcomputer 30 can identify the angle of the pressing operation by detecting the two output voltages.

Figure 7:
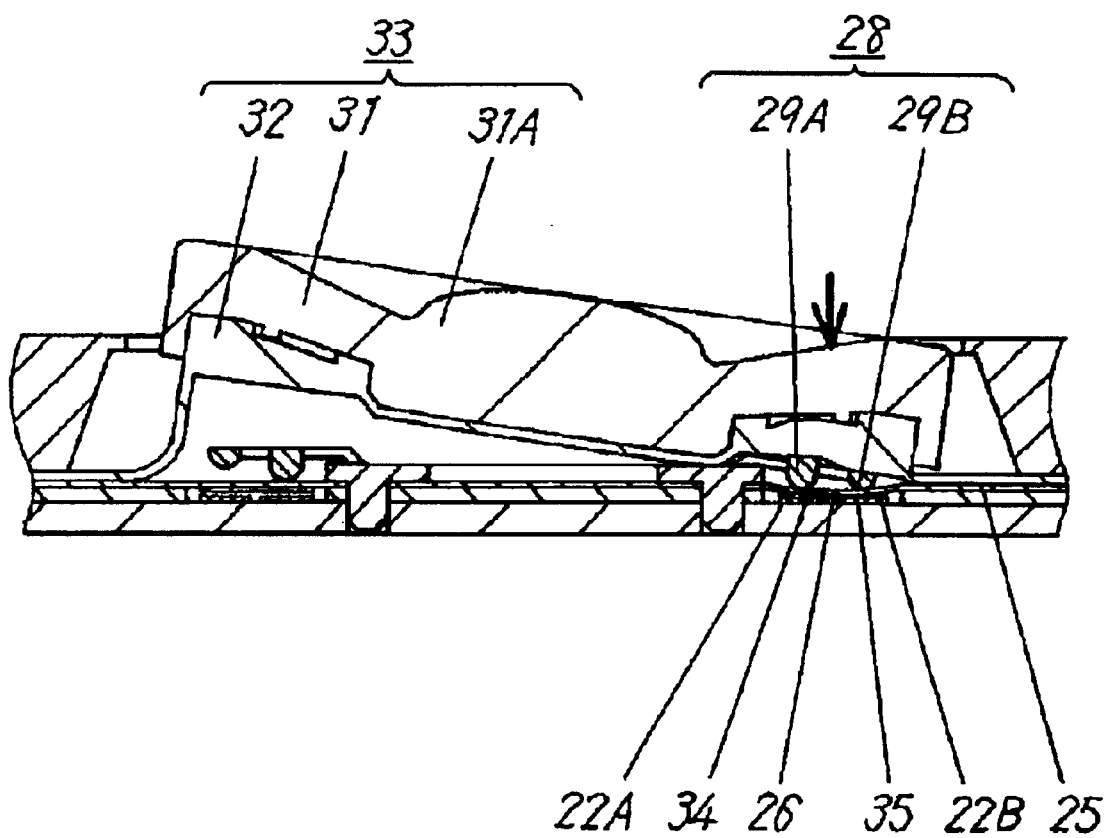
FIG. 7 is a front cross sectional view of the multi-directional input device of embodiment 1.

FIG. 7 is a front cross sectional view of the switch including the operating disk 33 depressed further than the state shown in FIG. 5. The operating disk 33 is further tilted about the lower corner at the peripheral edge of the center disk region 31A of the hard operating head 31, thus causing the elastic pressing member 32 to deflect at the point of pressing the inner hard ring 29A of the driving member 28 and press the outer hard ring 29B against the upper side of the resistor sheet 25. As the resistor sheet 25 is pressed down and deflected at its larger area, the resistor layer 26 directly contact the outer annular conductive layer 22B developing a point of contact 35. Accordingly, the electrical connection can be made between the lead ports 27A to 27C of the resistor layer 26 and the lead port 23B of the outer annular conductive layer 22B.

Figure 8:
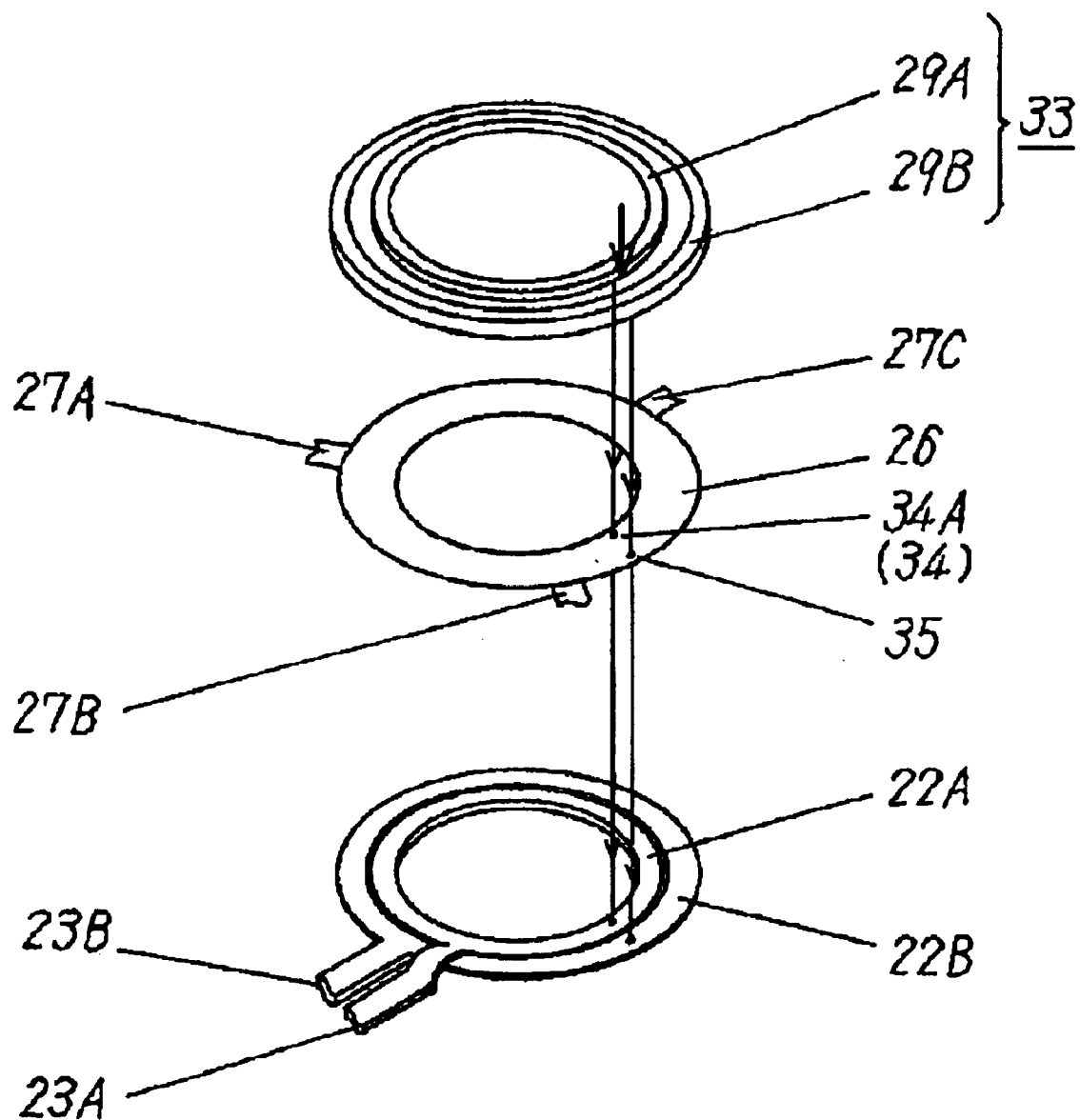
FIG. 8 is a schematic view of the multi-directional input device of embodiment 1 for explaining an operation of inputting of a switching location.

FIG. 8 is a schematic view for explaining detection of a load applied onto the upper side of the operating disk 33. When the lead ports 27A to 27C of the resistor layer 26 are supplied with a DC voltage under the same condition as shown in FIG. 6, the voltage output from the lead port 23B of the outer annular conductive layer 22B is substantially equal to that of the lead port 23A of the inner annular conductive layer 22A.

The output voltage is then detected by the microcomputer 30. The microcomputer judges that the load applied onto the upper side of the operating disk 33 is small if the output voltage is received from only the lead port 23A of the inner annular conductive layer 22A, and the load is large if the output voltage is additionally received from the lead port 23B of the outer annular conductive layer 22B.

As described, the load applied onto the upper side of the operating disk 33 is measured at two different levels. The microcomputer 30 may measure that load at a desired number of levels if the desired number of the annular conductive layers 22 facing the resistor layer 26 and the desired number of the hard rings 29 of the driving member 28 are provided.

Then, when the load applied onto the upper side of the operating disk 33 has been removed, the yielding force of the elastic pressing member 32 and the driving member 28 makes the operating disk 33 return back to its original horizontal position. This operation permits the resistor sheet 25 to return to its original position by its elastic effect. As the resistor layer 26 departs from the annular conductive layers 22A and 22B, the multi-directional operation switch accordingly returns back to its original state.

As described, according to the present embodiment, the multi-directional input device using the multi-directional operation switch of embodiment 1 can operate in all direction for the switching operation and has a reduced height. The device can input different levels of the loads of for pressing operations in the direction, thereby increasing a resolution of the input levels.

Figure 9A:
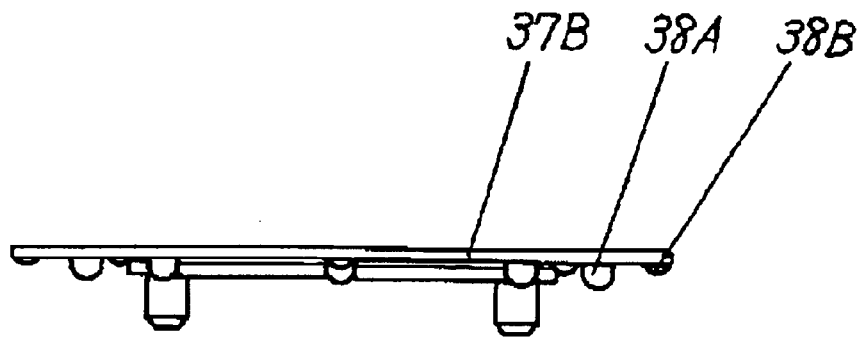
FIG. 9A is a front cross sectional view of another driving member of the multi-directional operation switch of embodiment 1.
Figure 9B:
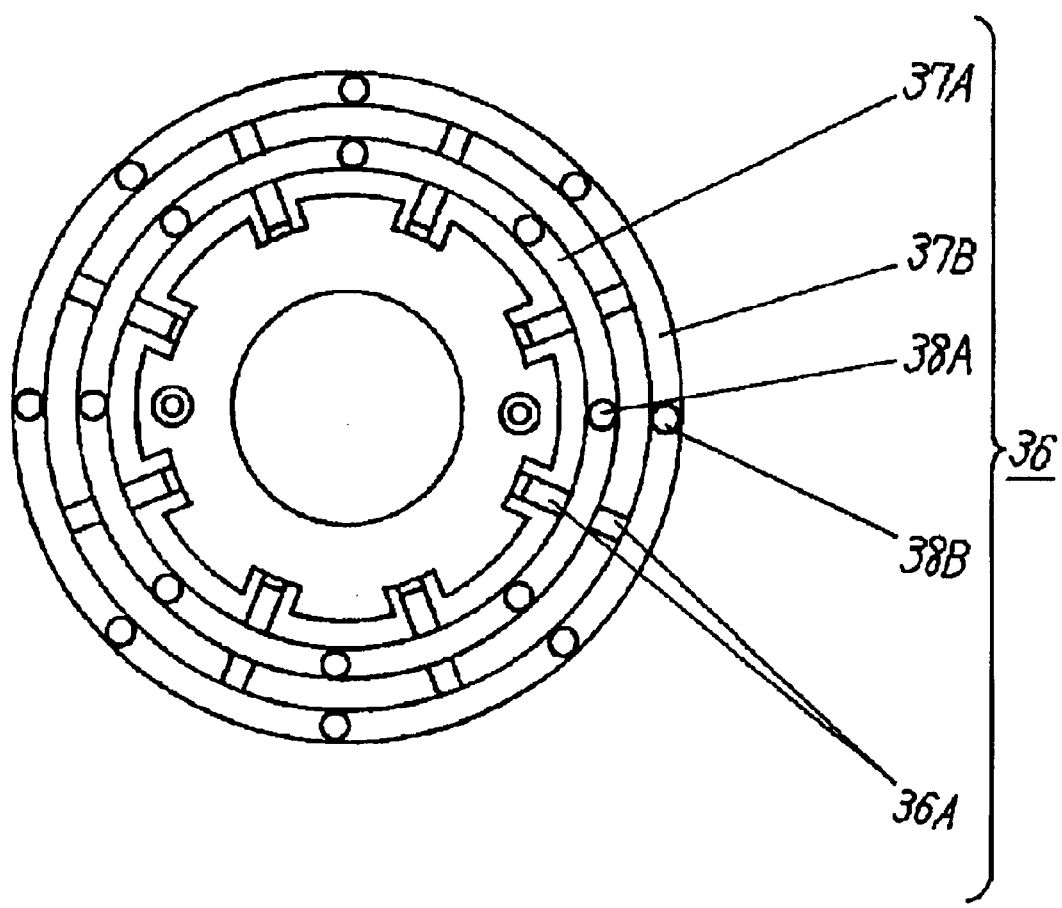
FIG. 9B is a lower side view of a further driving member of the multi-directional operation switch of embodiment 1.

FIG. 9A is a front view of another driving member, and FIG. 9B is a lower side view of the member. The driving member 36 has eight projections 38A provided on a lower side of a hard ring 37A and eight projections 38B provided on a lower side of a hard ring 37B. The hard rings are supported by elastic arms 36A.

The driving member 36 of the multi-directional operation switch of embodiment 1 allows the resistor layer 26 of the resistor sheet 25 to be electrically connected to the annular conductive layer 22A or 22B precisely when the operating disk 33 is tilted in any of eight different directions to contact the corresponding projections 38A and 38B. More specifically, if the operating disk 33 of the multi-directional operation switch of the electronic device of the present embodiment shifts to predetermined angular directions, the projections 38A and 38B at the angular direction ensures the switching operation easily and accurately.

In the above description, as being tilted down at one direction, the operating disk 33 presses the inner hard ring 29A against the resistor sheet 25 to connect the resistor layer 26 to the inner annular conductive layer 22A. Then, as being further tilted down, the operating disk 33 presses the outer hard ring 29B to connect the resistor layer 26 to the outer annular conductive layer 22B. A further multi-directional operation switch will be explained referring to a front cross sectional view of FIG. 10, in which the resistor layer 26 is first connected to the outer annular conductive layer 22B.

Figure 10:
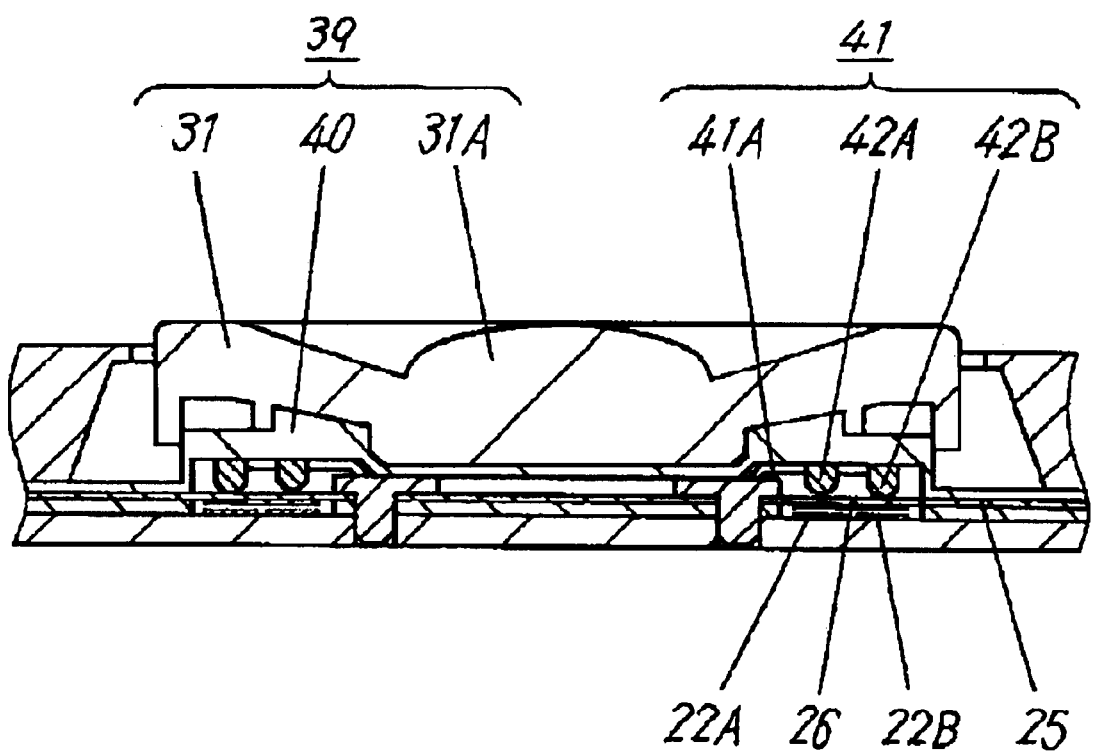
FIG. 10 is a front cross sectional view of another multi-directional operation switch of the multi-directional input device of embodiment 1.

In the normal state shown in FIG. 10, the lower side of the hard operating head 31 is spaced by a distance from the upper side of an elastic pressing member 40 located over an outer hard ring 42B, which is different from the head 31 shown in FIG. 1. More particularly, the outer hard ring 42B supported by elastic arms 41A extends lower than an inner hard ring 42A.

Figure 11A:
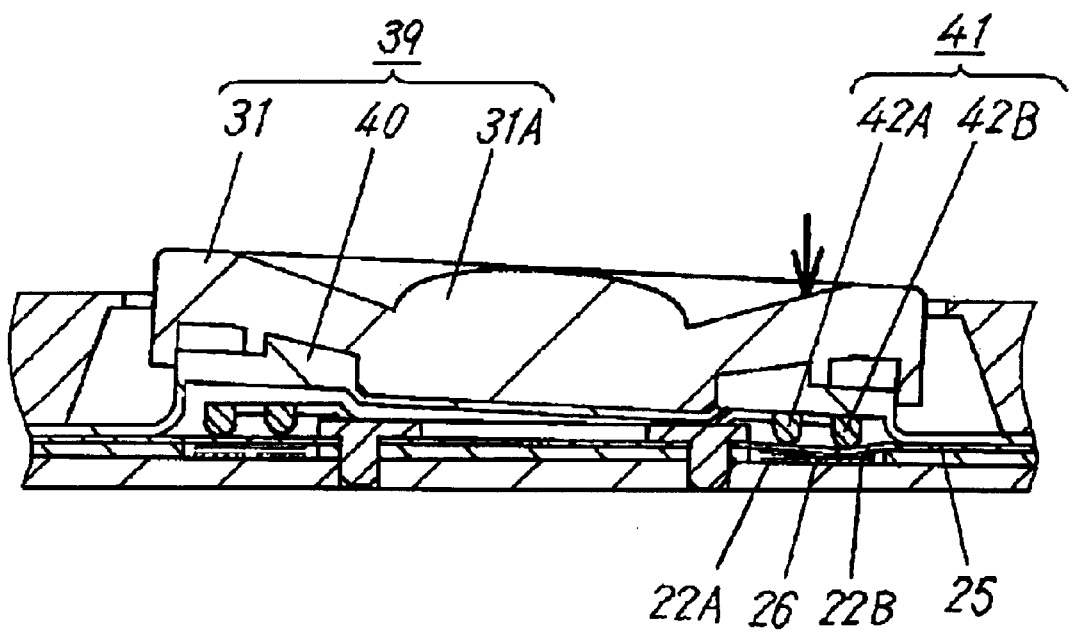
FIGS. 11A and 11B are front cross sectional views of a further multi-directional operation switch of embodiment 1.

When the upper side of an operating disk 39 is depressed at a desired location, the operating disk 39 tilts down about the lower corner at a peripheral edge of the center disk region 31A of the hard operating head 31 which acts as a fulcrum to a position, as shown in FIG. 11A. This operation causes the lower side of an elastic pressing member 40 to press a driving member 41, and thus to press down the outer hard ring 42B, hence deflecting a corresponding area of the upper side of the resistor sheet 25. Accordingly, the downward deflection of the resistor sheet 25 thus permits the connection at a point of contact between the resistor layer 26 and the outer annular conductive layer 22B.

Figure 11B:
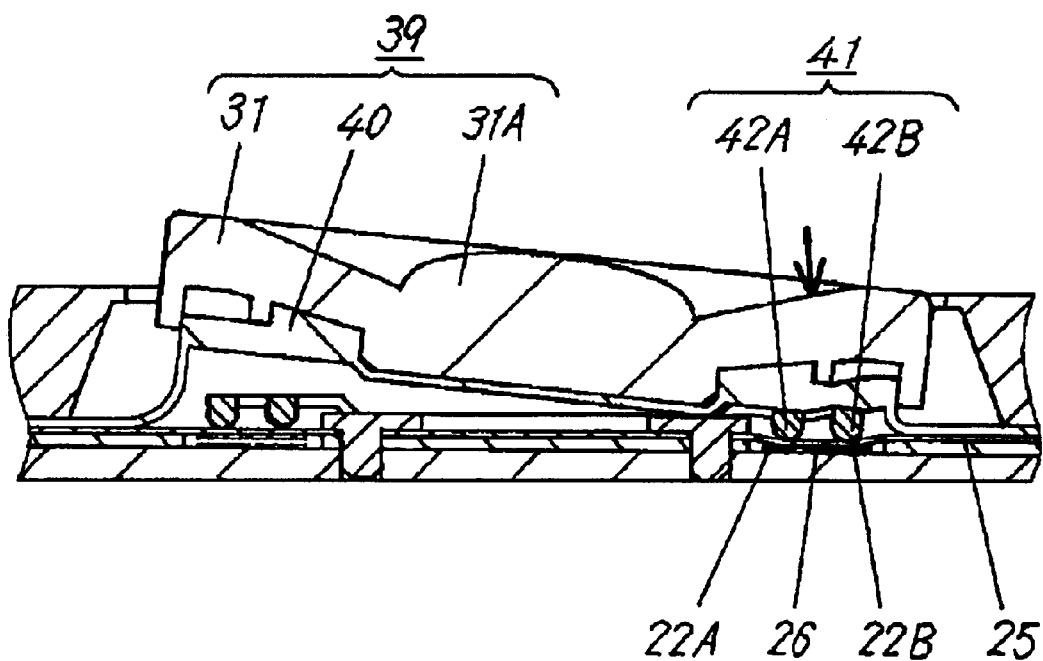

When being further depressed, the operating disk 39 further tilts down to a position, as shown in FIG. 11B. This causes a portion of the elastic pressing member 40 depressing the outer hard ring 42B to upwardly deflect by its elasticity and to move into the space beneath the hard operating head 31. Simultaneously, the lower side of the inner hard ring 42A presses and deflects the resistor sheet 25. The downward deflection of the resistor sheet 25 accordingly connects a point of contact of the resistor layer 26 to the inner annular conductive layer 22A.

Similarly, applying a DC voltage to the lead ports 27A to 27C of the resistor layer 26 at a situation shown in FIGS. 11A and 11B, the microcomputer detects the angular direction and the load of the pressing operation during the pressing of the operating disk 39.

As described, another multi-directional operation switch of embodiment 1 may allow the annular conductive layers to be electrically connected with the resistor layer at the lower by any sequence, e.g. starting from the inner side or the outer side.

In case that three or more of the annular conductive layers are provided with the switch, the layers may be connected in a desired sequence while the elastic pressing member of the operating disk is modified in its shape and the hard rings of the driving member are adjusted in the length of the projections. Also, if including a single annular conductive layer, the switch produces a signal indicating and does not the pressing strength but the angular direction of the operation.

Although each of the annular conductive layers in this embodiment has the lead port, the conductive layers may be connected in series via a resistor provided between any two adjacent annular conductive layers, and the lead ports are connected to the innermost layer and the outermost layer of the layers. This arrangement permits the detection of an angular direction while simplifying its wiring arrangement.

The operating disk may arbitrarily be modified in its shape as long as it presses down, with its pressing portion, the resistor sheet for electrically connecting the resistor layer to the annular conductive layer.

(Embodiment 2)

A multi-directional operation switch according to exemplary embodiment 2 of the present invention will be described. Like components are denoted by like numerals as those of embodiment 1 and are explained in no more detail.

Figure 12:
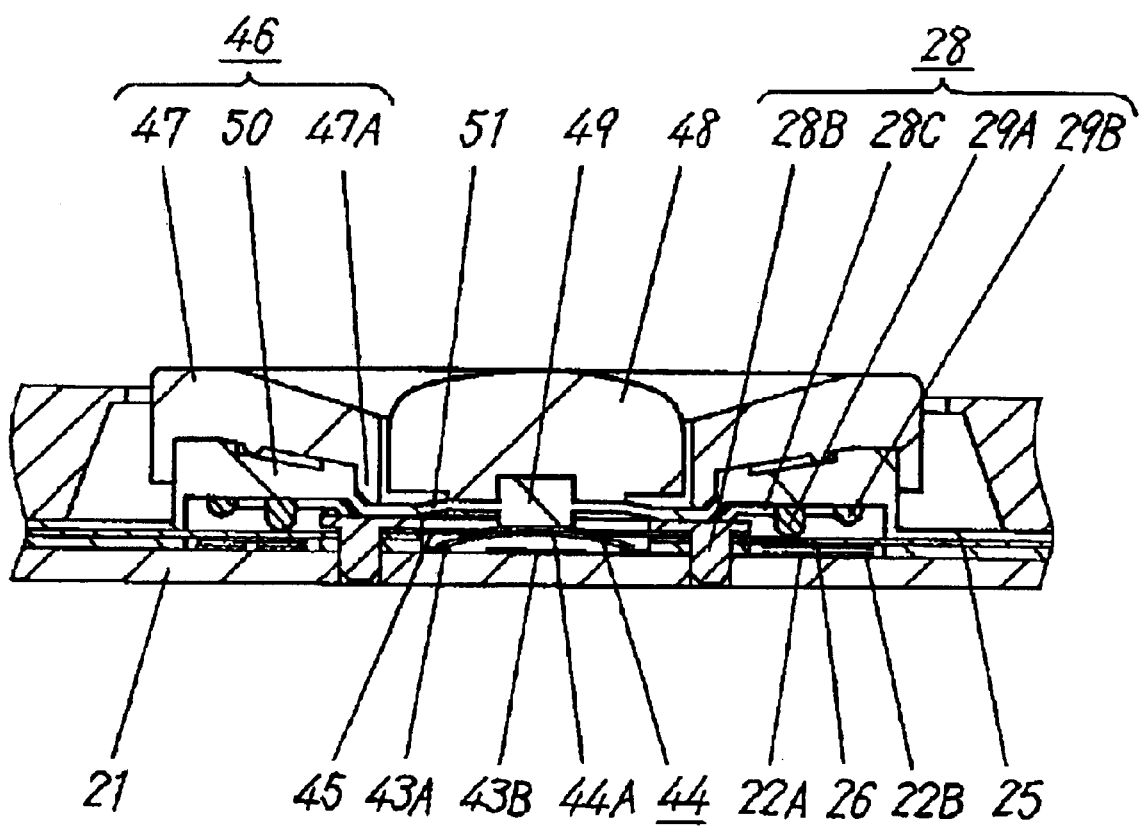
FIG. 12 is a front cross sectional view of another multi-directional input device as an electronic device equipped with a multi-directional operation switch according to exemplary embodiment 2 of the invention.

FIG. 12 is a front cross sectional view of an electronic device using the multi-directional operation switch of embodiment 2. The multi-directional operation switch includes the switch of embodiment 1 and a center switch of self-return type provided beneath the center of the switch of embodiment 1 and arranged to operate by pressing separately of the switch of embodiment 1.

The center switch includes an outer contact 43A and a center contact 43B located at the center of two annular conductive layers 22A and 22B which are identical to those of embodiment 1 and are provided on the insulating board 21 as a wiring board of the electronic device, and a dome-shaped movable contact 44 made of elastic thin metal and provided over the contacts 43A and 43B. More specifically, the lower side of a rim of the movable contact 44 is located on the outer contact 43A while a dome-shaped region 44A is spaced at the lower side by a distance from the center contact 43B. The dome-shaped region 44A of the movable contact 44 is covered at top with an elastic insulating sheet 45. The elastic insulating sheet 45 is fixedly mounted by two projections 28B of the driving member 28 to the insulating board 21.

The switch of embodiment 2, similarly to that of embodiment 1 includes the annular conductive layers 22A and 22B, and further includes the center switch contact 43A and 43B provided on the insulating board 21 as a wiring board of the electronic device, hence reducing the number of components and its overall size, and making the switch inexpensive.

In the switch of this embodiment, an annular operating disk 46, which corresponds to the operating disk 33 excluding the center disk region 31A has a push button 48 made of hard resin provided at the center operating region of an annular hard operating head 47 of the disk 46. A pressing projection 49 fixedly joined to the lower side of the push button 48 supports the dome-shaped region 44A of the movable contact 44 with its top via the elastic insulating sheet 45.

The pressing projection 49 is made of elastic insulating material, such as resin or rubber, identical to material of an elastic pressing member 50 joined to the lower side of the annular hard operating head 47. The pressing projection 49 is formed integral with the elastic pressing member 50 as joined by a joint portion 51 to each other so as to connect the annular operating disk 46 to the push button 48. Accordingly, an operation assembly including the annular operating disk 46 and the push button 48 is fabricated in its stable size and in an accurate positional relationship inexpensively, thus improving the effect of dust-proof at every joint.

In the switch, the annular conductive layers 22A and 22B provided over the insulating board 21, the resistor sheet 25 provided over the resistor layer 26, and the hard rings 29A and 29B supported by the elastic arms 28C of the driving member 28 are identical to those of the switch of embodiment 1 shown in FIGS. 1 to 4B.

An operation of the multi-directional operation switch of embodiment 2 having the above arrangement will be explained referring to front cross sectional views of FIGS. 13A and 13B.

Figure 13A:
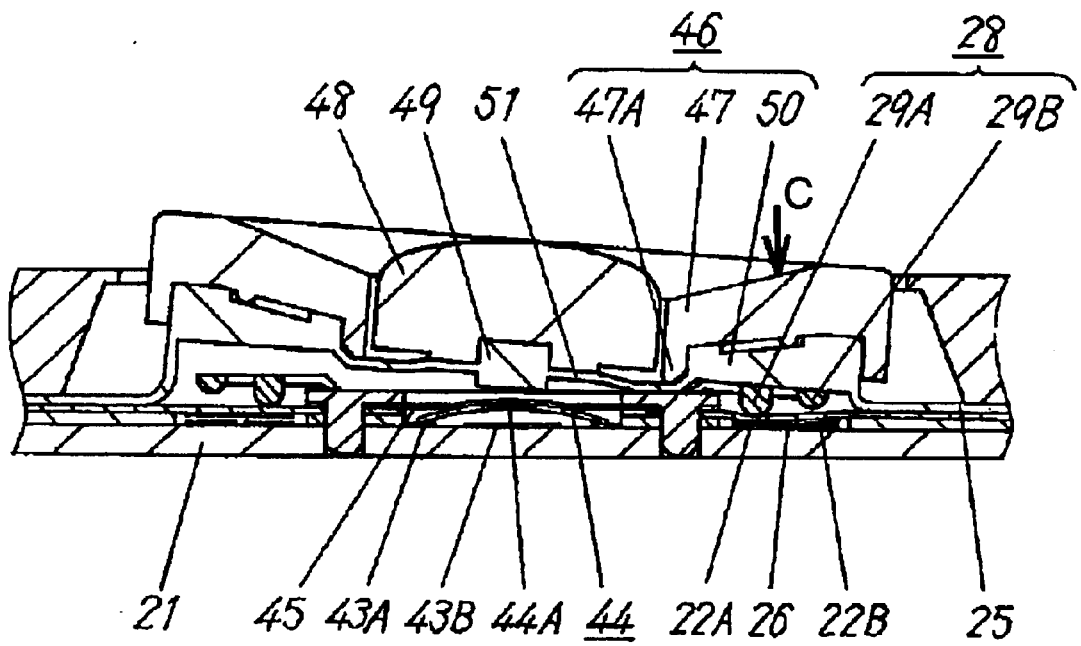
FIGS. 13A and 13B are front cross sectional views of the multi-directional operation switch of the multi-directional input device of embodiment 2.

As shown in FIG. 13A, when being depressed at the top in a direction C, the annular operating disk 46 tilts about the inner edge of a lower projecting portion 47A of the hard operating head 47. As the elastic pressing member 50 moves downward by the operating disk 46, the elastic pressing member 50 accordingly presses down the hard ring 29A of the driving member 28, and thus have the resistor sheet 25 deflect to directly connect the resistor layer 26 with the inner side annular conductive layer 22A.

Figure 13B:
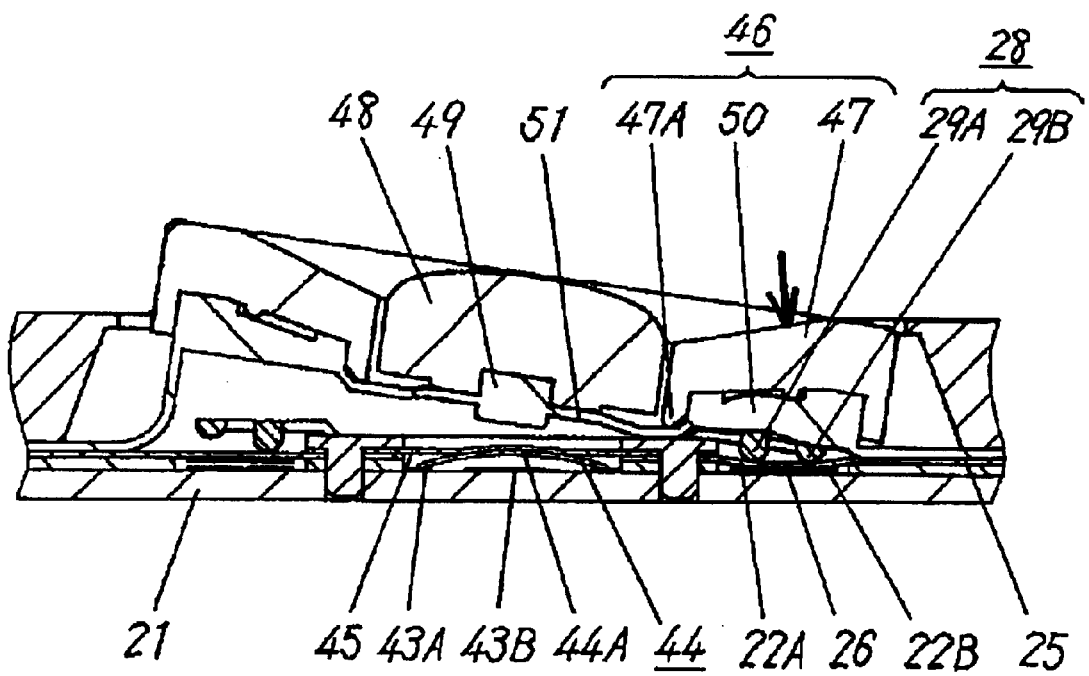

Then, when being further depressed at the top in the direction, the annular operating disk 46 tilts about the inner edge of the lower projecting portion 47A of the hard operating head 47, as shown in FIG. 13B. As the elastic pressing member 50 is driven downward by the operating disk 46, the elastic pressing member 50 accordingly deforms elastically and presses down the outer hard ring 29B to connect the resistor layer 26 of the resistor sheet 25 with the outer side annular conductive layer 22B. This operation is identical to that of embodiment 1.

Accordingly, an angular direction and a load of the operation of the operating disk 46 shown in FIGS. 13A and 13B can thus be detected similarly to embodiment 1.

Then, the pressing against the upper side of the operating disk 46 is canceled, the multi-directional operation switch can return back to its normal state by elastic-back effect of the yielding force of the elastic pressing member 50, the resistor sheet 25, and the like.

Meanwhile, as the operating disk 46 is depressed at the upper side and tilts, the push button 48 linked with the joint portion 51 to the annular operating head 46 lifts upward and departs from the top of the dome-shaped portion 44A of the movable contact 44. At the moment, the movable contact 44 remains at its position since the dome-shaped portion 44A is covered at the top with the elastic insulating sheet 45 mounted to the insulating board 21.

Figure 14:
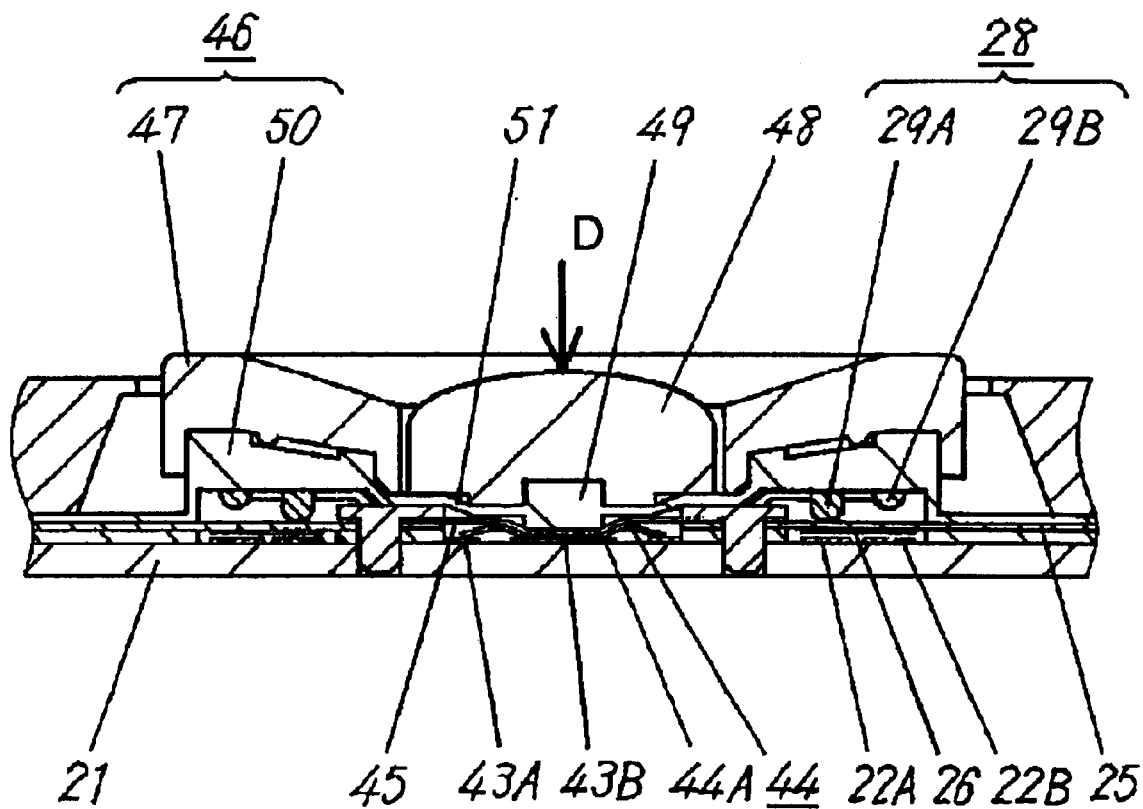
FIG. 14 is a front cross sectional view of the multi-directional input device of embodiment 2.
Figure 15:
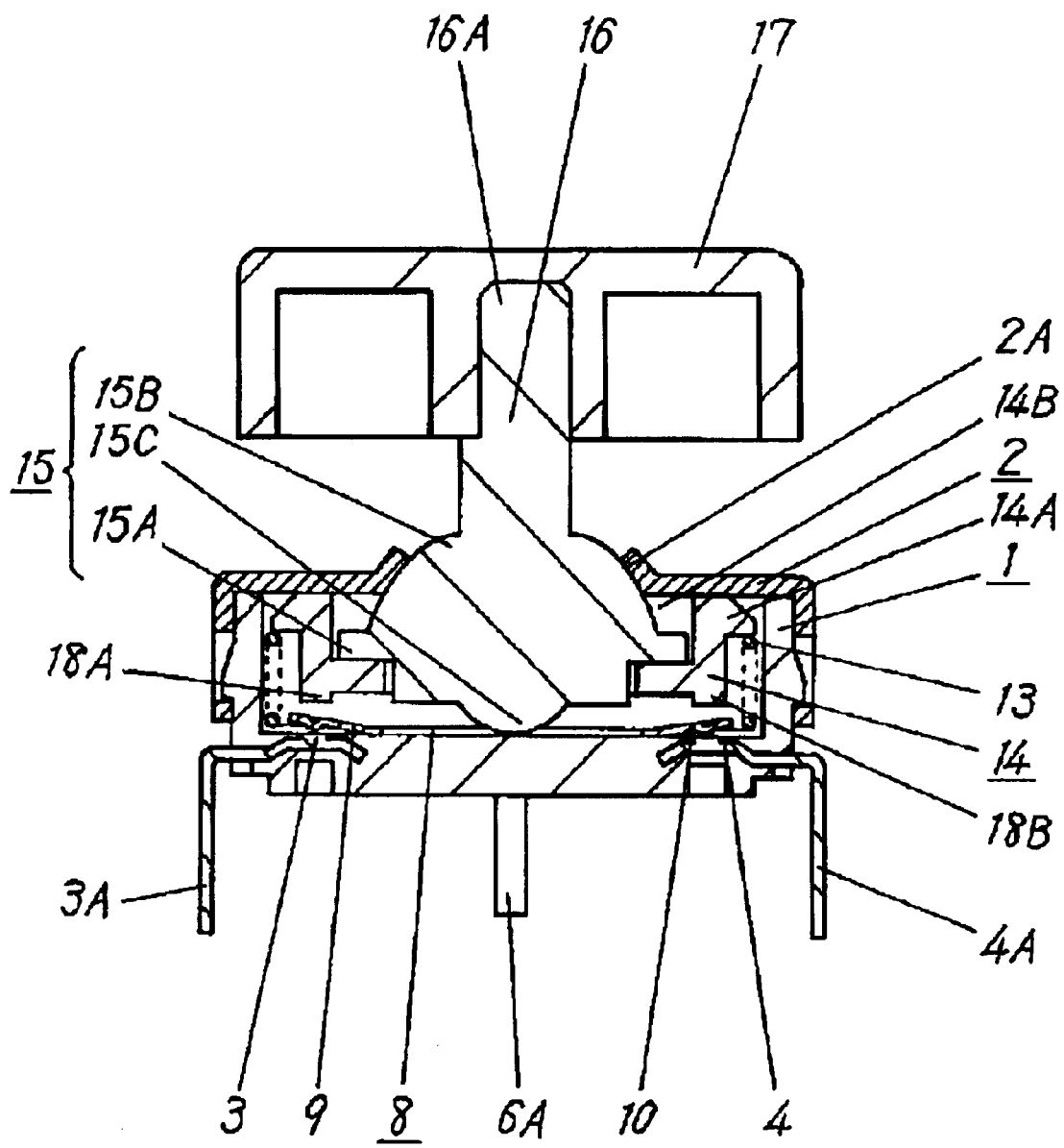
FIG. 15 is a front cross sectional view of a conventional multi-directional operation switch.
Figure 16:
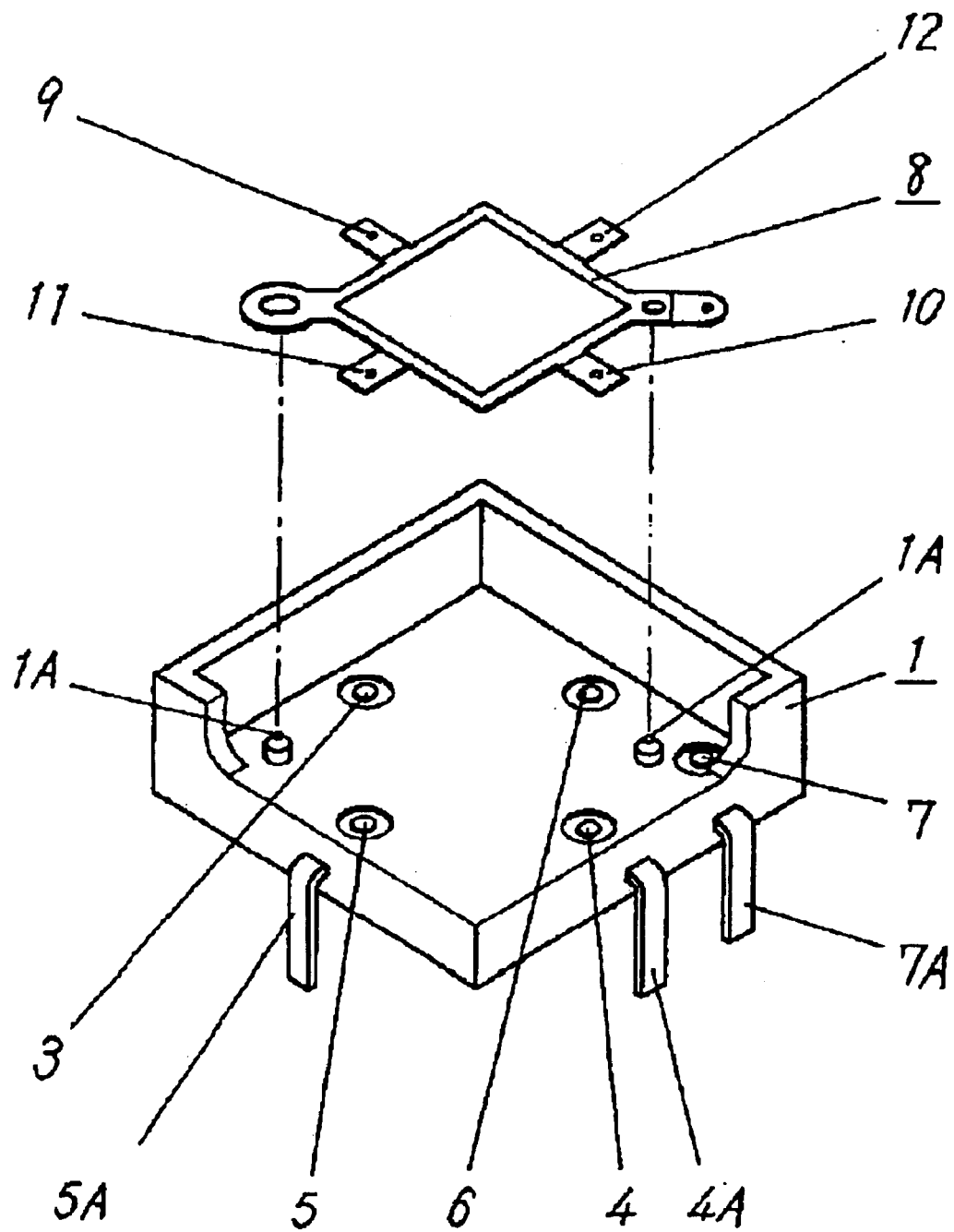
FIG. 16 is an exploded perspective view of a switching contact of the conventional multi-directional operation switch.
Figure 17:
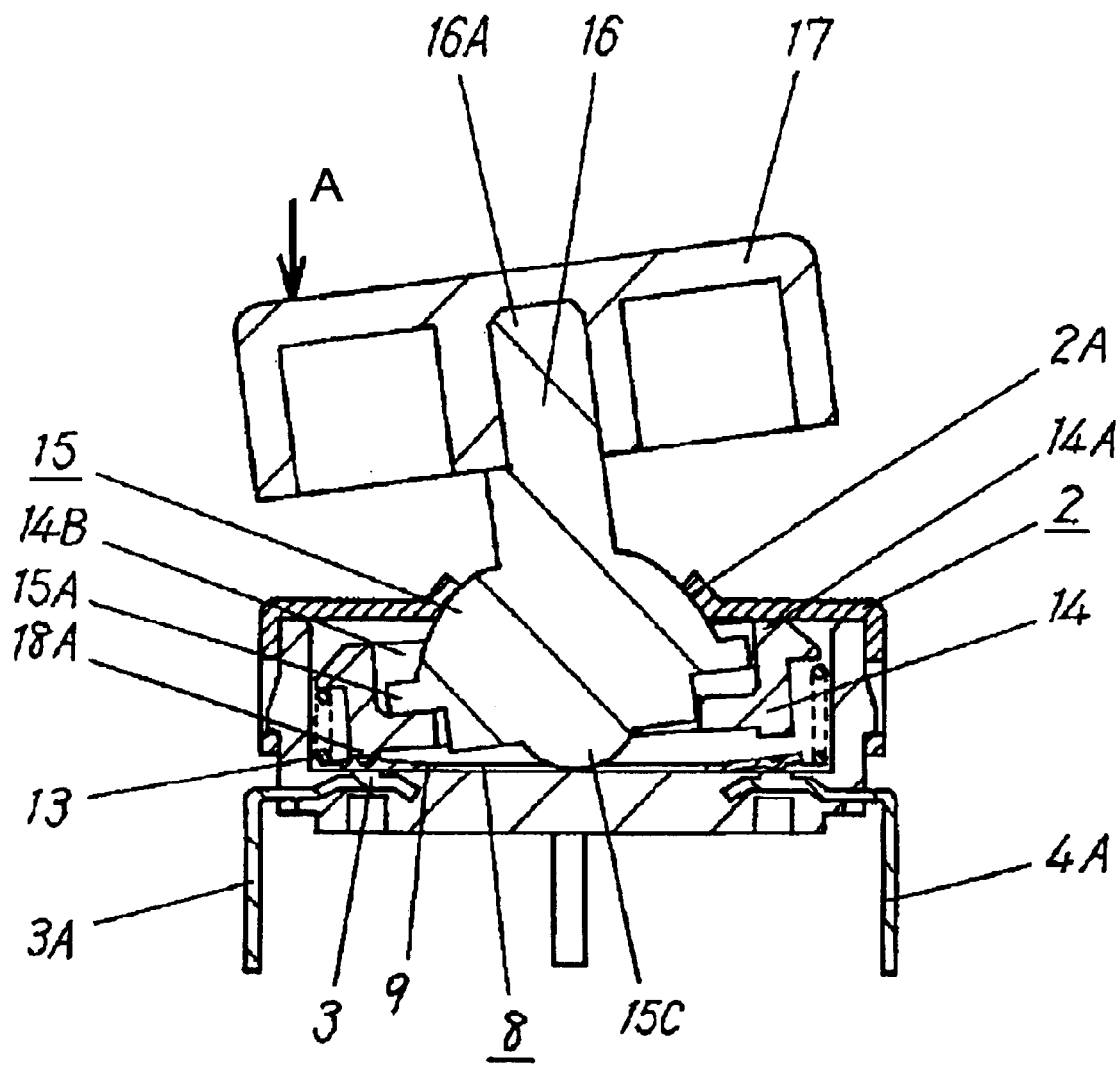
FIG. 17 is a front cross sectional view of the conventional multi-directional operation switch.

When the push button 48 at the center is depressed in a direction D shown in FIG. 14, the pressing projection 49 moves downward and deflects the joint portion 51 and the elastic insulating sheet 45, thus pressing the dome-shaped portion 44A of the movable contact 44.

The dome-shaped portion 44A of the movable contact 44 is then elastically inverted in its shape with a click feeling, thus having its bottom directly contact the center contact 43B. This operation permits the outer contact 43A to be connected with the center contact 43B, hence transmitting a switching signal via wiring (not shown) on the insulating board 21 to a circuit of the electronic device.

Then, when the pressing against the push button 48 is canceled, the movable contact 44 is turned back to its original dome shape by its spring-back effect of its yielding force and separated from the center contact 43B. Accordingly, the center contact 43A is disconnected from the outer contact 43A and is made open.

As described, the switch of embodiment 2 has an advantage identical to that of the switch of embodiment 1 inputting different levels of input operations according to the angular directions and the load of the pressing operation to the operating disk 46. In addition, while having a reduced height, the multi-directional operation switch of embodiment 2 is responsive to the depressing of the push button 48 for outputting a signal which can be used for enabling the input operation of the operating disk 46 with the click feeling.

The operating member of this embodiment, similarly to embodiment 1, may arbitrarily be modified to any other shape than the described shape as long as the member tilts according to its operating action and presses down the resistor sheet to electrically connect the resistor layer with the annular conductive layer while is configured to a ring-like shape to allow the push-button switch to be located in a center opening of the member.

What is claimed is:

1. A multi-directional operation switch comprising:
    a plurality of annular conductive layers provided concentrically and having lead ports, respectively;
    a first insulating sheet spaced by a distance from said plurality of annular conductive layers, said first insulating sheet being elastic;
    an annular resistor layer provided on a first side of said first insulating sheet, said annular resistor layer facing said plurality of annular conductive layers and having at least three lead ports; and
    an operating member including a plurality of pressing portions provided over said plurality of annular conductive layers corresponding to said plurality of pressing portions, respectively, said plurality of pressing portions being provided over a second side of said first insulating sheet, said plurality of pressing portions of said operating member pressing said first insulating sheet to make said plurality of annular conductive layers sequentially contact said resistor layer.

2. The multi-directional operation switch according to claim 1, wherein said operating member further includes a plurality of hard rings having said plurality of pressing portions at respective first sides thereof and arranged over said plurality of annular conductive layers corresponding to said pressing portions, respectively.

3. The multi-directional operation switch according to claim 2, wherein said operating member further includes an elastic arm for supporting said plurality of hard rings, and for allowing said plurality of hard rings to separately be displaced elastically in a direction perpendicular to said first insulating sheet.

4. The multi-directional operation switch according to claim 2, wherein said operating member further includes elastic pressing members provided on respective second sides of said plurality of hard rings.

5. The multi-directional operation switch according to claim 2, wherein said operating member further includes an operating head provided at an opposite side to said plurality of hard rings and having a size to entirely cover said plurality of hard rings.

6. The multi-directional operation switch according to claim 1, wherein at least one of said plurality of pressing portions has projections thereof extending towards said first insulating sheet.

7. The multi-directional operation switch according to claim 1, wherein said plurality of pressing portions extend towards said first insulating sheet, and provided at positions corresponding to predetermined operation directions.

8. The multi-directional operation switch according to claim 1, further comprising an insulating board having said plurality of annular conductive layers located thereon.

9. The multi-directional operation switch according to claim 8, further comprising:
    a first fixed contact provided on said insulating board substantially at a center of said plurality of annular conductive layers;
    a second fixed contact provided on said insulating board inside an innermost annular conductive layer of said plurality of annular conductive layers;
    a dome-shaped movable contact made of elastic thin metal and having a center thereof located over said first fixed contact and an outer edge thereof located over said second fixed contact; and
    a push button provided over said movable contact.

10. The multi-directional operation switch according to claim 9, wherein said operating member further includes an annular operating head located over said plurality of annular conductive layers corresponding to said annular operating head, wherein said push button is located at a center of an annular shape of said operating head.

11. The multi-directional operation switch according to claim 10, further comprising a pressing projection provided between said push button and said movable contact.

12. The multi-directional operation switch according to claim 11, further comprising an elastic joint formed unitarily with said pressing projection to link said operating head to said push button.

13. The multi-directional operation switch according to claim 9, further comprising a second insulating sheet fixedly mounted to said insulating board, said second insulating sheet entirely covering said movable contact.

14. The multi-directional operation switch according to claim 8, wherein said insulating board is a wiring board of a device to which said multi-directional operation switch is installed.

15. A multi-directional operation input device comprising:
    a multi-directional operation switch including
        a plurality of annular conductive layers provided concentrically and having lead ports, respectively,
        a first insulating sheet spaced by a distance from said plurality of annular conductive layers, said first insulating sheet being elastic,
        an annular resistor layer provided on a first side of said first insulating sheet, said annular resistor layer facing said plurality of annular conductive layers and having at least three lead ports, and
        an operating member including a plurality of pressing portions provided over said plurality of annular conductive layers corresponding to said plurality of pressing portions, respectively, said pressing portions being provided over a second side of said first insulating sheet, said plurality of pressing portions of said operating member pressing said first insulating sheet to make said plurality of annular conductive layers sequentially contact said resistor layer;
    means for applying a voltage between said lead ports of said resistor layer;
    means for measuring a voltage between said lead ports of said plurality of annular conductive layers; and
    means for identifying a load and a position of a pressing operation onto said operating member according to said measured voltage.

* * * * *